Figure 1:
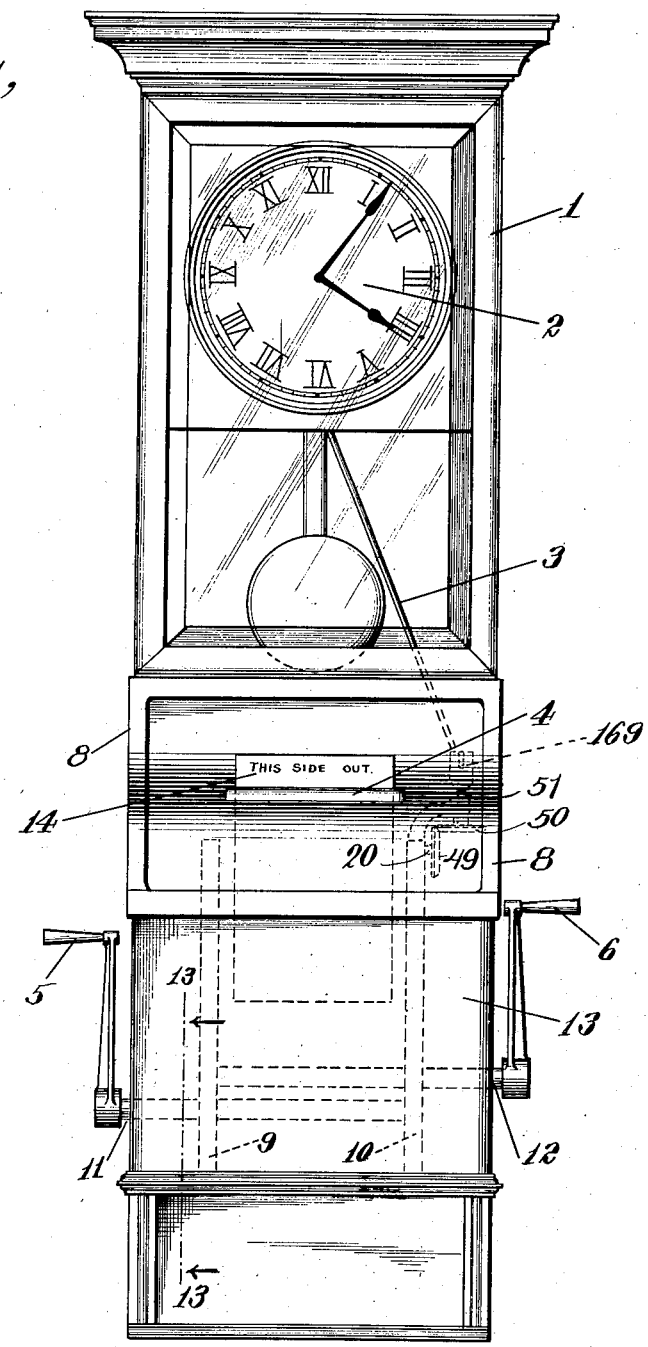

J. W. BRYCE.
ELAPSED TIME RECORDER.
APPLICATION FILED JUNE 18, 1909.

1,069,384.

Patented Aug. 5, 1913.
6 SHEETS—SHEET 1.

WITNESSES:
John O. Gempler
W. A. Hutton

INVENTOR
James W. Bryce,
BY
Kenyon & Kenyon
his ATTORNEYS

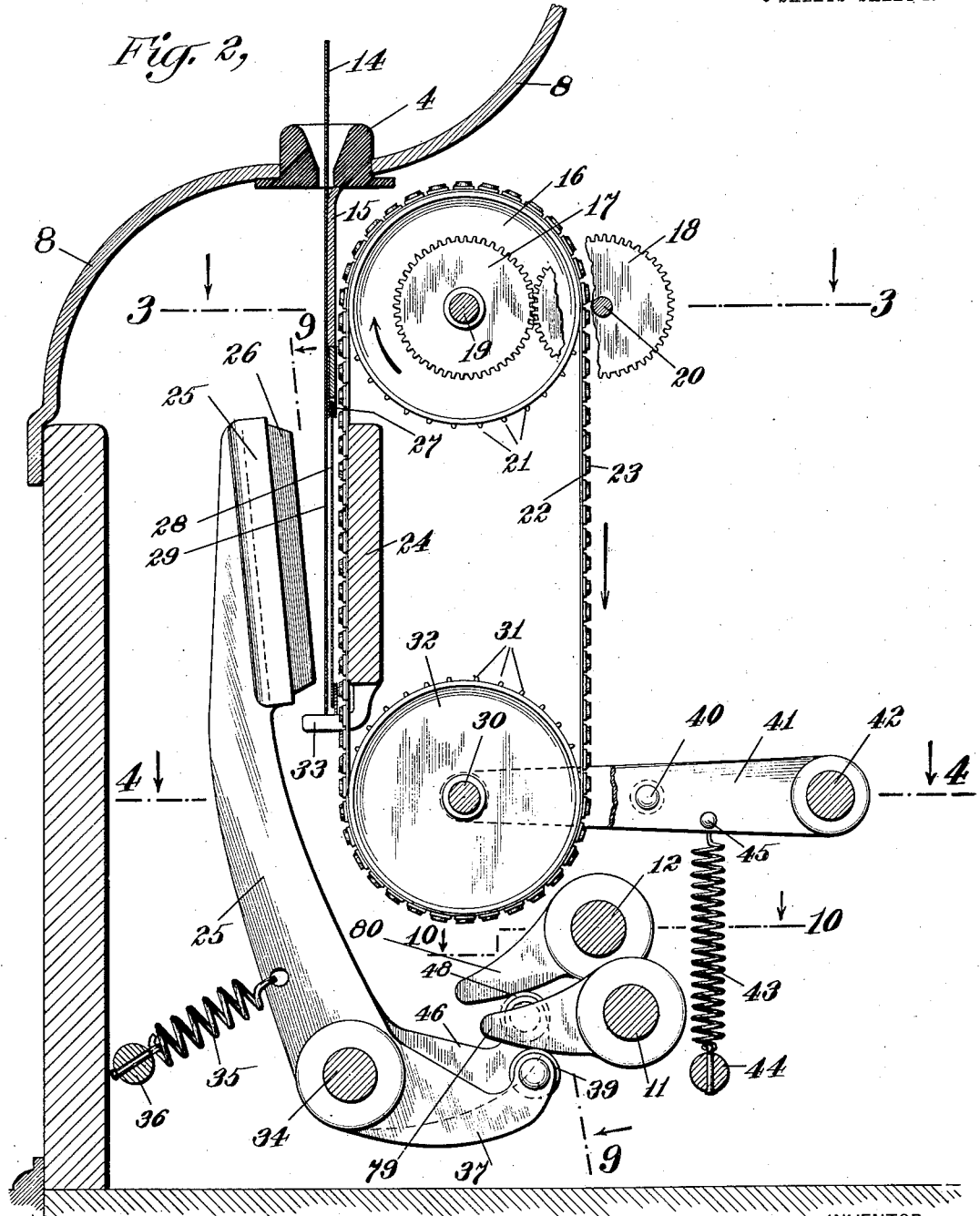

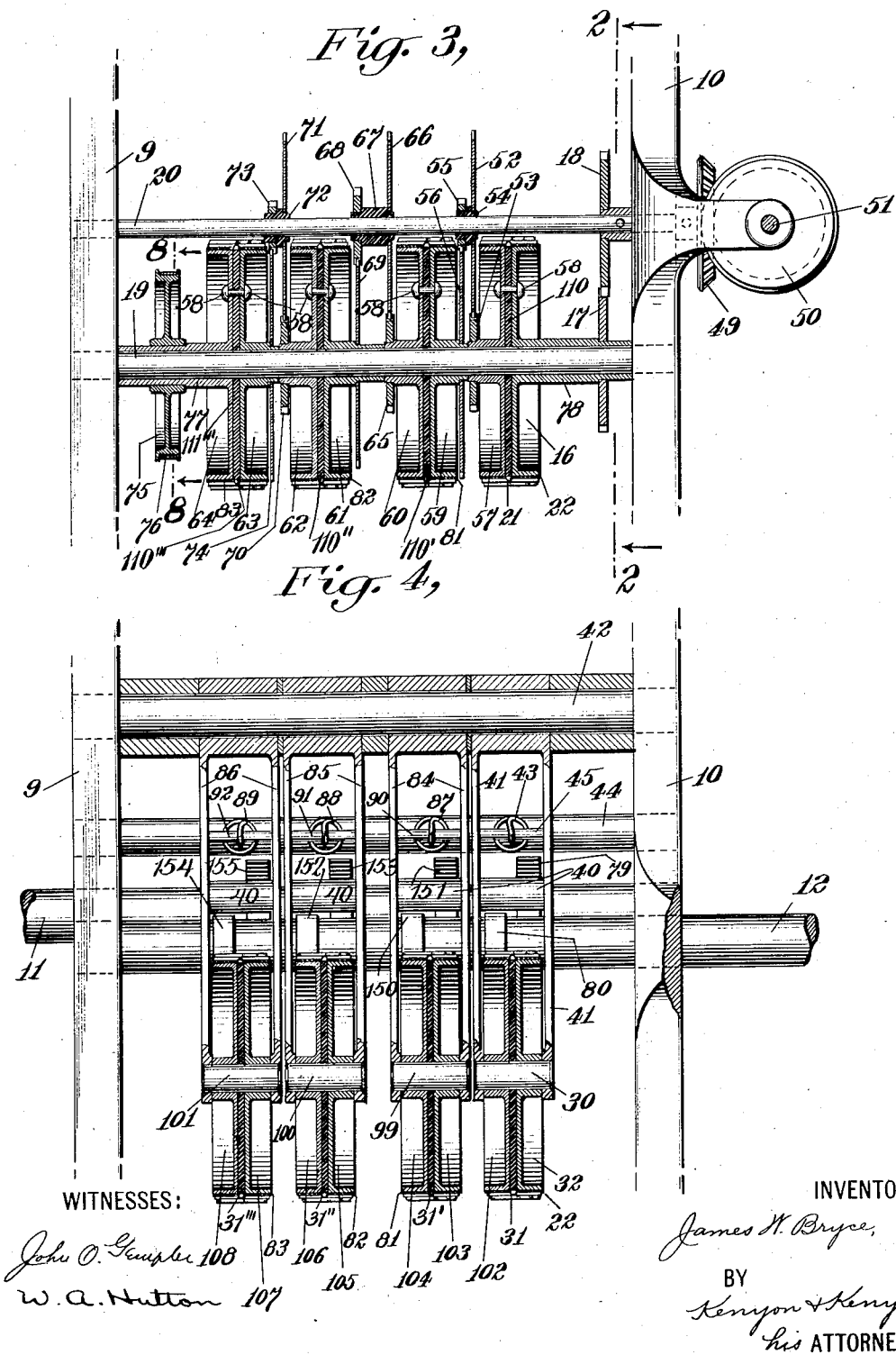

J. W. BRYCE.
ELAPSED TIME RECORDER.
APPLICATION FILED JUNE 18, 1909.
1,069,384.
Patented Aug. 5, 1913.
6 SHEETS—SHEET 4.
Fig. 5,
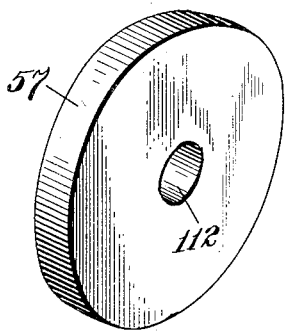
Fig. 6,
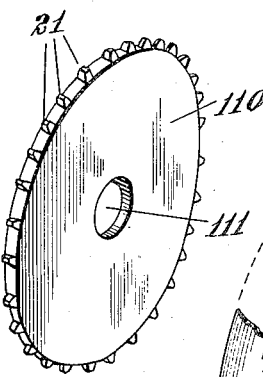
Fig. 7,
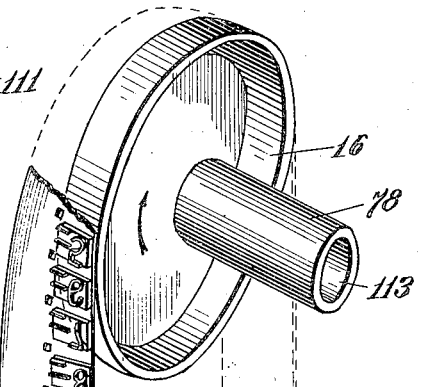
Fig. 8,
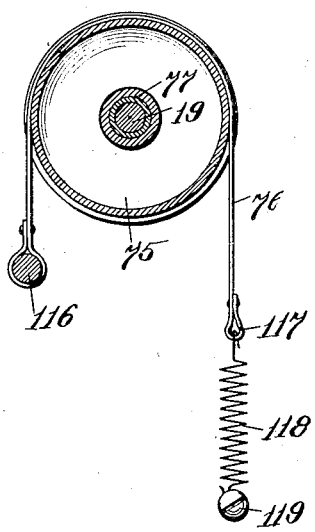
WITNESSES:
John O. Gensler
W. A. Hutton
INVENTOR
James W. Bryce,
BY
Kenyon & Kenyon,
his ATTORNEYS

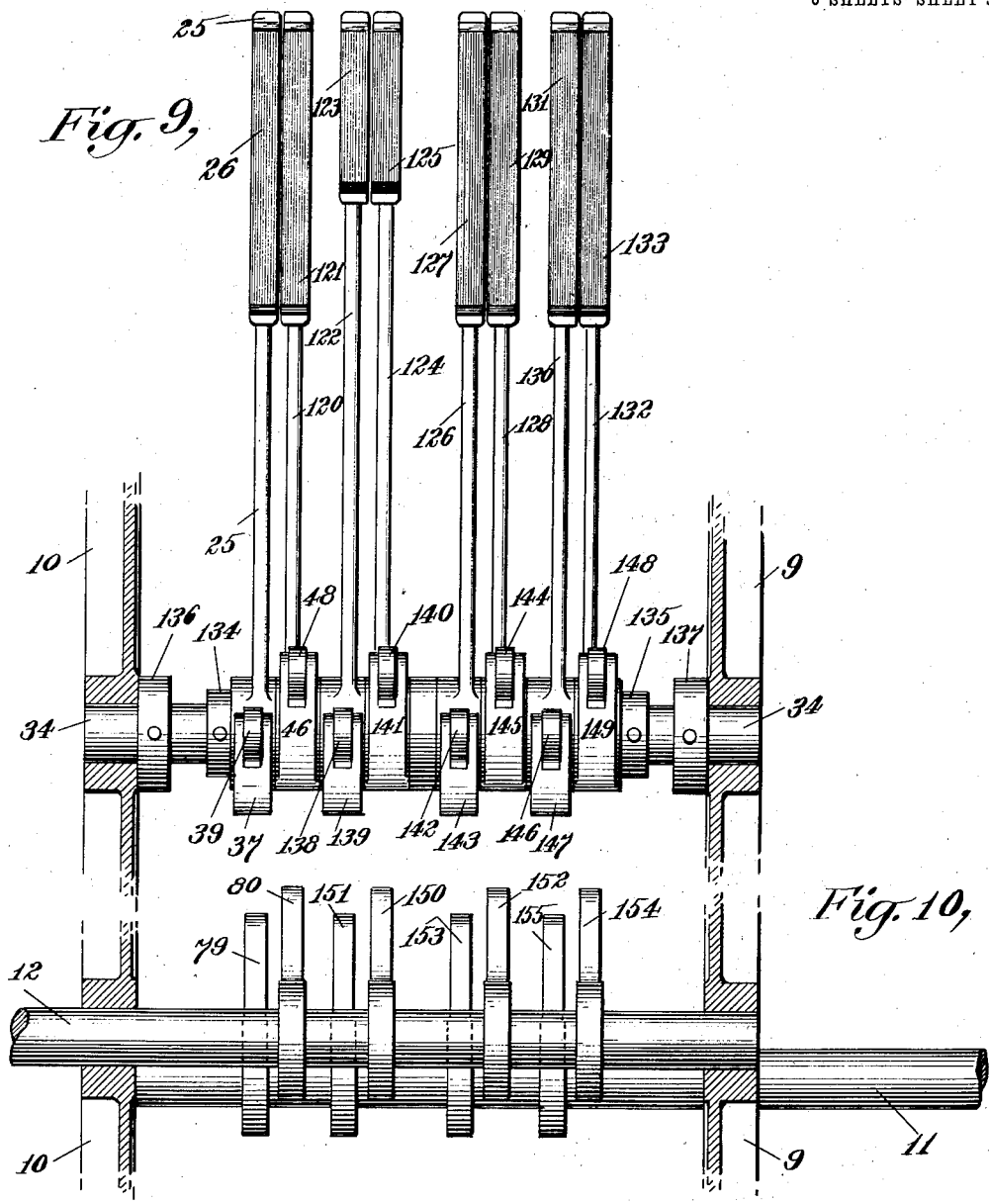

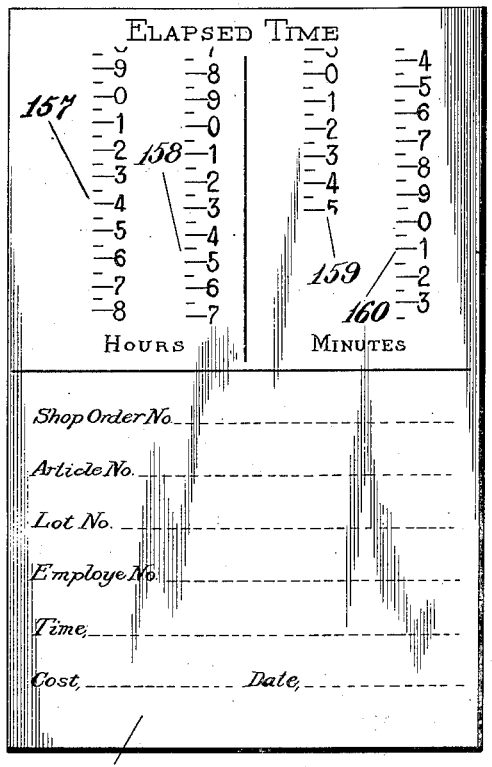
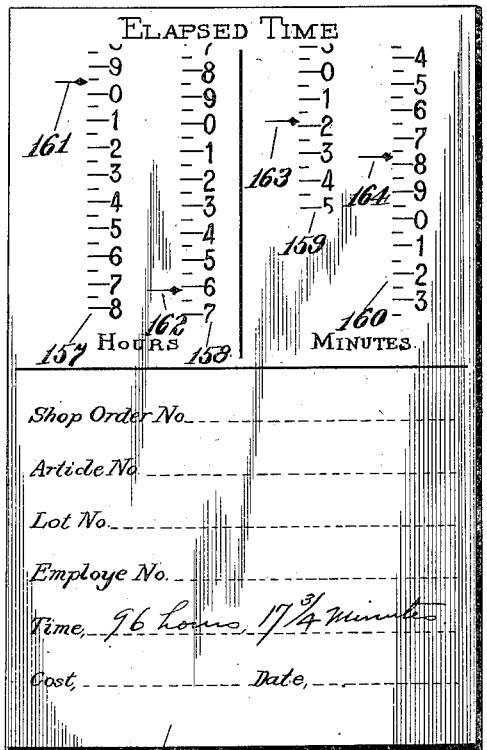
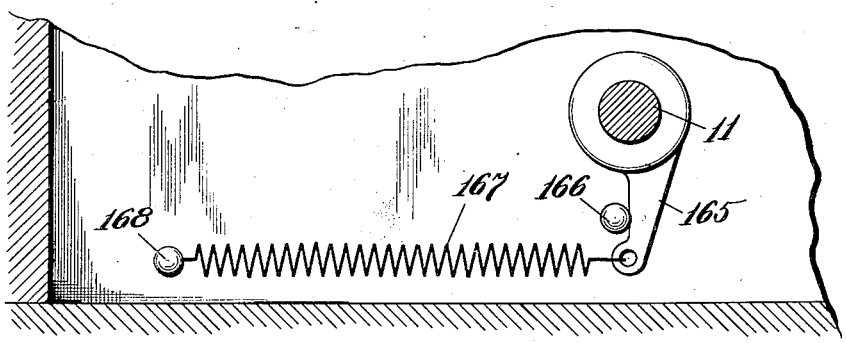

UNITED STATES PATENT OFFICE.

JAMES W. BRYCE, OF BROOKLYN, NEW YORK.

ELAPSED-TIME RECORDER.

1,069,384.　　　　　Specification of Letters Patent.　　Patented Aug. 5, 1913.

Application filed June 18, 1909. Serial No. 502,893.

*To all whom it may concern:*

Be it known that I, JAMES W. BRYCE, a citizen of the United States, and a resident of Brooklyn, in the county of Kings and State of New York, have invented certain new and useful Improvements in Elapsed-Time Recorders, of which the following is a specification.

My invention relates to elapsed time recorders. Its object is to provide new and improved means for calculating and recording elapsed time; to record elapsed times on a suitable record surface, preferably a card or equivalent device, by means of a record of units of denomination of time, preferably of a series of units of different denominations of time, printed in a straight line upon such record surface and by means of an elapsed time indicating mark printed in such a position opposite to the said line of units or opposite to each of the said lines of units, to indicate elapsed time between two operations; also to provide a new and improved record of elapsed time, easily legible and always presenting the same point of view to the observer; also to provide new and improved printing devices for elapsed time recording machines.

In the drawings accompanying this specification and forming part hereof, I have shown the preferred form of my invention and will now proceed to describe the same.

Referring to the specific embodiment of my invention shown in the drawings, Figure 1 is a front view of a machine embodying my invention in its preferred form. Fig. 2 is a vertical section thereof on the lines 2—2 of Fig. 3. Fig. 3 is a horizontal section on the lines 3—3 of Fig. 2. Fig. 4 is a horizontal section on the lines 4—4 of Fig. 2. Fig. 5 is a perspective view of the left-hand half of the minute driving wheel, Fig. 6 of the driving sprocket of the same and Fig. 7 of the right-hand half of the minute driving wheel, the latter view showing a part of the type carrying band. Fig. 8 is a detail section of the friction wheel and band used to prevent back-lash. Fig. 9 is a section taken on the line 9—9 of Fig. 2, showing the printing pads of the various columns, 2 for the minutes, two for the tens of minutes, two for the hours and two for the tens of hours. Fig. 10 is a detailed horizontal section on the line 10—10 of Fig. 2. Fig. 11 is a view of a card, adapted to be used in the machine, and appearing as after the first or "ringing in" operation. Fig. 12 is a face view of the same card after the second or "ringing out" operation. Fig. 13 is a detail view of spring return for operating the handle.

The machine described herein belongs to that class of machines which do not have identification time devices, and which therefore do not automatically calculate elapsed time. It prints two diagrams, consisting one of a complete cycle of units of the different denominations covered by the machine, the units of each denomination being printed in a straight line, and the other of an elapsed time indicating device printed opposite the other diagram, one elapsed time identification device opposite each line of units, the location of such device relative to the line of units indicating the elapsed time represented in such units of denomination. Thus in the example shown on card 156 in Figs. 11 and 12, the one diagram consists of the four lines of units, 157 representing the tens of hours, 158 the hours, 159 the tens of minutes and 160 the minutes, and the other diagram consists of the single elapsed time identification device, as shown an arrow, that of the tens of hours being represented by the arrow 161, that of the hours by the arrow 162, that of the tens of minutes by the arrow 163 and that of the minutes by the arrow 164. In the example there shown, the elapsed time, as appearing in Fig. 12, is readily apparent to the eye by the location of the different arrows. In the illustration there given, the elapsed time is 96 hours and 17 minutes and approximately three-quarters of a minute. The three-quarters of a minute is indicated by the relative location of the arrow 164, which is about three-quarters of the distance between the units 7 and the units 8 of the units denominations of minutes.

In order to give a clearer idea of the operation of the machine, I will first describe what the operator does and the results that follow and then will describe the mechanism in detail. The operator first inserts into the slot 4 his card 156 with the back 14 toward him with the heading "This side out" at the top. He then pulls the lever 5 forward as far as possible and releases it and removes his ticket from the receiver. The lever 5 is automatically returned to its place by means presently to be described. The result of this operation, which is the first operation by any workman, is shown in Fig. 11. As there shown, there has been printed upon the card 4 columns of figures 157, 158, 159 and 160, each column representing the units of a separate denomination of time and each arranged in a straight and vertical line easily read by any one holding the card in the ordinary position. Column 157 represents the units of tens of hours, column 158 those of the hours, column 159 those of the tens of minutes and 160 those of the minutes. The relative location or arrangement of the units of any denomination upon the card will be dependent upon the time of operation, as will be presently understood. Upon the completion of his work, either at the close of the day, or at the end of his job, which may be either before the close of the day or upon any day subsequent to that upon which the work is begun, the operator again inserts the same card and this time pulls forward the lever 6 as far as it will go and then releases it, whereupon it will automatically return to its position, as will be presently described. The result of this second operation is illustrated in Fig. 12. The effect of this second operation has been to print upon the same card opposite to each column of figures an elapsed time identification mark representing the elapsed time between the first and second operation in the units of each denomination. These elapsed time indicating marks, as shown in Fig. 12, are the arrows 161, 162, 163 and 164, representing the elapsed times in the said denominations of time. The location of each arrow with reference to the numerals representing the units of the denomination will represent the elapsed time in that denomination between the two operations. Thus arrow 161 represents 90 hours, the arrow 162 six hours, the arrow 163 ten minutes and the arrow 164 seven minutes and substantially three-quarters of a minute of elapsed time. The total of elapsed time can thus be easily read from the card as 96 hours and 17¾ minutes.

I will now proceed to explain in detail the mechanism of the machine.

1 represents the casing of the machine, 2 the clock movement, 3 the drive shaft connecting the clock movement with the other parts of the mechanism.

8 is the front of the casing of the machine containing the card slot 4, into which the card 156 is inserted.

The drive shaft 3 is provided with a universal joint 169 connecting it to shaft 51, upon the lower part of which is secured bevel gear 50 meshing with bevel gear 49 on shaft 20 and driving that shaft in accordance with the time. Fast on shaft 20 is a spur gear 18, meshing with a spur gear 17 fast to a sleeve 78 loose on shaft 19. Fast on sleeve 78 is the right-hand half 16 of the minute driving gear. Secured to this half 16 is a sprocket wheel 110 provided with sprocket teeth 21 adapted to engage holes 109 in an endless type band 22. This type band is provided with type 23 running from zero to 9 inclusive representing the minutes. Band 22 is driven continuously by the clock movement at the rate of an advance of one type each minute. Shaft 19 is stationary, being secured in the side frames 9 and 10 of the machine. The endless band 22, at its lower end, passes around a tension wheel, composed of wheel 32, sprocket 31 and wheel 102 loosely mounted on a short shaft 30 supported in two arms 41 secured together by connecting rod 40 fast to each, and loosely pivoted on a stationary shaft 42 supported in side frames 9 and 10. A spring 43, connected to one of the arms 41, at 45, and to a rod 44 running from and supported by side frames 9 and 10, tends to hold sprocket wheel 32 in its downward position, keeping band 22 taut.

57 is the left-hand half of the minute driving wheel and it and sprocket wheel 110 and the right-hand half 16 of the minute driving wheel are secured together by a rivet 58 (Fig. 3). Sleeve 78 is provided with a cylindrical opening 113, sprocket wheel 110 with an opening 111 and 57 with an opening 112, through which passes shaft 19. Part 16, 110 and 57 form an integral structure moving together loosely on shaft 19. Endless band 22 is also provided with a number of elapsed time indicating marks, two of which are shown in Fig. 7, and are there numbered 114 and 115 and as there shown, are in the form of arrows. These are located opposite the initial unit of each of the series of denominations upon the band. The band is shown as containing a number of complete set of units beginning at zero and running up to and through 9. Each arrow, the elapsed time indicating marks, is opposite the zero of its series of the denomination. These series form a continuous series extending entirely around the band 22.

24 represents a platen which is of sufficient height to cover an entire series of the ten units and 28 represents the ink ribbon and 29 a part of the card 14 opposite the platen. Platen 24 is provided with a shelf 33, upon which the card rests when fully inserted.

Opposite the band 22 are two printing pads 26 and 121, the former mounted on a lever 25, the latter on a lever 120 loose on shaft 34 which is held in position by collars 136 and 137, the latter shaft extending between and supported by the side frames 9 and 10. The printing pad 26 is for printing the line of type representing the units of minutes, shown at the right of endless band, as viewed in Fig. 7, and the printing pad 121 is for printing the elapsed time indicating marks 114, 115, et seq., shown at the left of band 22, as viewed in Fig. 7. These printing pads are operated at different times. The printing pad 26 for printing the line of units is operated at the first operation of the machine when the operator pulls down handle 5. The printing pad 121 for printing the elapsed time identification marks consisting of the arrows 114, 115, etc., is operated on the second operation by an operator when he pulls down handle 6, as will be presently described. Endless band 22 is made of any suitable flexible material, such for instance as rubber. Accordingly, when the printing pad 26, which is opposite the line of type 23 representing the units of minutes is operated, only the units of minutes will be printed by it upon the card, and when the pad 121 is operated, at a second or later operation of the machine, only the elapsed time identification marks 114, 115, etc., will be printed upon the card. The band 22 is preferably continuously driven by the clockwork. The direction of drive is shown by the arrows in Fig. 2, being upward on the left-hand side, as viewed in that figure, and downward on the right. This brings the units of the minutes denomination 23 past the platen and printing pad in a straight line, so that they are printed upon the card in a straight line, as shown in Fig. 11. At the second operation of the machine, one time identification mark is printed opposite the previously printed line of units. As this identification mark is opposite the initial unit of the denomination, as shown zero, its location upon the printed card will indicate the extent to which the minute endless band 22 has been moved since the first operation, or in other words, will indicate in minutes the elapsed time between the two operations.

It will be understood that similar endless bands, driving sprockets, tension sprockets and printing pads are provided for each denomination of time. As shown, those for the tens of minutes consist of the right-hand part 59, and left-hand part 60 and sprocket 110' of the tens of minutes driving wheel provided with a similar endless band 81 having on the right-hand end numerals from zero to 5 inclusive representing the tens of minutes and on the left-hand arrows opposite each zero and corresponding tension wheels composed of parts 103 and 104 and sprocket wheel 31' mounted on shaft 99; for the hours, the driving wheel composed of the parts 61, 62 and sprocket 110" together with a similar endless band 82, provided on the right-hand side with numerals from zero to 9 inclusive, representing the hours, and on the left the elapsed time indicating marks opposite the zeros consisting of arrows, and a tension wheel consisting of parts 105 and 106 and sprocket wheel 31" mounted on shaft 100; and the tens of hours driving sprocket consisting of parts 63 and 64 and sprocket 110''', an endless band 83 provided with units from zero to 9 inclusive on the right-hand side representing tens of hours and on the left with arrows opposite the zeros, and a tension wheel consisting of parts 107, 108 and sprocket 31''' mounted on shaft 101.

In order to prevent back-lash, I preferably provide on the sleeve 77 of the tens of hours driving wheel a wheel 75, around part of the periphery of which passes a brake-band 76 secured at one end to a stud 116 fast in the framework and having secured at its other end, at 117, a spring 118, pivoted to a stud 119 secured to the framework. As the different driving wheels are all geared together, as will be presently described, the spring 118 of brake-band 76 exerts a gentle pressure upon the entire set of driving wheels, preventing back-lash. The different parts of each driving wheels are secured together by means of rivets 58, as already described in reference to the minute driving wheel.

The driving wheels are all continuously driven by the clockwork. That for driving the minute wheel has been already described. The minute wheel is connected by gearing with the tens of minute wheel, the latter with the hours, and that with the tens of hour wheel so as to give a continuous drive in the proper ratio. This is accomplished by means of the following mechanism. On the hub of minute wheel 57 is secured spur gear 53, which meshes with a larger spur gear 52 mounted on hub 54 loose on shaft 20. The other end of hub 54 carries the spur gear 55, which meshes with the large spur gear 56 fast to the tens of minutes wheel 59. The gearing between the two is so arranged that one complete revolution of the minute wheel would carry the tens wheel forward one-tenth of that distance. The tens of minutes wheel is similarly geared by means of spur gear 65 meshing with spur gear 66 on hub 67, loose on shaft 20, and carrying at its other end spur wheel 68, meshing with spur wheel 69 on part 61 of the hours driving wheel. This gearing is geared 6 to 1. The hour wheel is secured to the tens of hours wheel by a 10 to 1 gearing through spur gear 70, 71, on hub 72, spur gear 73 on the hub meshing with spur gear 74 fast to tens of hours driving wheel 63.

By the above arrangement, the different endless bands are continuously advanced or moved upward, as viewed in Fig. 2, and in the proportions already stated. Accordingly, the location of the different lines of units, as printed on the card, will be in accordance with the time of a first operation of the machine.

As the elapsed time indicating arrows stand opposite the zero or initial point, and as they are not printed at the first operation, but are printed at the second (the columns of units not being printed at the second operation), the location of the arrow in each column will indicate the progress that has been made in that denomination of time since the first operation. Thus in Fig. 12 the arrow 161 indicates that since the first operation, where it stood opposite to the zero, it has moved nine full units and part of the tenth, arrow 162 that it has moved six full units and part of the next, and so on.

It will be observed from the above that each line of type is moved continuously and in a straight line past the printing device or printing pads and platen. The platen 24 is made broad enough to include all of the four lines, or columns and each column is provided, as is the minute column, with two printing hammers, one for the line of units and the other for the arrows or elapsed time indicating marks.

The printing pads for the different columns are shown in Fig. 9. For the minutes, the printing pad for the line of units is 26, and for the arrows 121; for the tens of minutes, the printing pad for the units of that denomination is 123, mounted upon lever 122, and for the arrows, 125 mounted upon lever 124; for the hours, the printing pad for the line of units of hours is 127 mounted upon lever 126 and the printing pad for the arrows is 129 mounted on lever 128, and the printing pad for the tens of hours line of units is 131 mounted upon lever 130 and the printing pad for the arrows of that denomination is 133 mounted upon lever 132. These are all loose on shaft 34 and held in position by collars 134 and 135.

I will now proceed to describe the means for operating the respective printing hammers. Handle 5, which is pulled down at the time of a first or "in" operation, is mounted upon a shaft 11. This shaft carries fast to it a series of projections 79, 151, 153 and 155 which stand respectively opposite to projections 37, 139, 143 and 147 forming part of levers 25, 122, 126 and 130 respectively connected with the respective printing pads for the units of time of the different denominations 26, 123, 127 and 131 respectively. As shaft 11 is rocked, the projections 79, 151, 153 and 155 strike against rollers 39, 138, 142 and 146 mounted on the corresponding projections of their respective printing pads and throw the printing pads forward to the right, as viewed in Fig. 2, against the card, ink ribbon, the units of type of that denomination on the respective endless bands, forcing them against platen 24 and printing in straight lines the units of the different denominations, as shown in Fig. 11. At a second operation of the machine, the operator pulls down handle 6. This is mounted on shaft 12, which carries fast to it a series of projections 80, 150, 152, 154, which stand opposite to rollers 48, 140, 144 and 148 loosely secured in projections 46, 141, 145 and 149 from levers 120, 124, 128 and 132 carrying respectively the printing pads for the arrows 121, 125, 129 and 133 respectively. This causes the arrows to be printed upon the card, as shown in Fig. 12.

As the endless bands are made of suitable flexible material, preferably rubber, the blow of any one of the printing hammers on one-half of the endless band prints upon the card only the representation of the type on the corresponding half of the band. Thus when one series of printing devices or pads are operated, the rows of units are printed in a straight line upon the card and when the other series of printing hammers are operated, the arrows are printed upon the card opposite the respective rows of units of the different denominations. In my device, I have shown the record surface as a card, although of course it will be understood that any suitable record surface may be employed for the purpose.

The tension wheels for the endless bands are all constructed as already described for the minutes tension wheel. Each is composed of two halves and a sprocket wheel riveted together and loosely supported upon a stud carried in swinging arms pivoted on stationary shaft 42. For the minutes, the tension wheel consists of parts 32 and 102 and sprocket wheel 31 fast on short shaft 30, loose in the ends of swinging arms 41.

40 is a strengthening rivet connecting the two arms 41 together. The tension device for the tens of minutes consists of parts 103 and 104 and sprocket 31' loose on short shaft 99, carried on swinging arms 84, fastened together by a similar rivet 40 and pulled down by spring 87 fastened to pin 90. The tension wheel of the hours denomination consists of parts 105, 106 and sprocket 31'' loose on short shaft 100 supported on swinging arms 85, 85, secured together by rivet 40 and pulled down by spring 88 fastened to pin 91. The tens of hours tension devices consist of parts 107 and 108 loose on short shaft 101 carried in swinging arms 86, 86, fastened together by rivet 40 and pulled down by spring 89 fastened to pin 92. The swinging arms are all loose on shaft 42.

It will be observed that the records made by my improved machine are always printed in vertical columns and are always presented to the observer from the same point of view. This is a distinct advantage over former elapsed time diagram records in the shape of a clock face which are continually shifting and which must be turned around in order to be read.

The capacity of my improved machine may, of course, be increased to any extent by increasing the number of recording bands. It is thus capable of indefinite expansion.

27 and 29 are guards for the ink ribbon. To each printing lever is fastened a return spring 35 secured to a rod 36 fast to the frame-work for returning it to its normal position after delivering a printing pressure.

In order to return lever 5 to its home position after being operated, an arm 165 (Fig. 13) is made fast to shaft 11, and to this is secured a return spring 167 secured to the casing of the machine at 168.

166 is a stop pin. A similar arrangement is provided for the lever arm 6 on the other side of the case of the machine.

Many changes in or modifications from the specific apparatus shown in the drawings may, of course, be made without departing from my invention. Thus it is not essential to my broad invention that bands or endless bands be used to carry the type as any suitable device, such as, for example, a cylinder, for supporting or carrying the type may be employed so long as the type are so arranged that when brought past the printing line they will print in a straight line upon the record surface. Again when one part is described as movable with reference to another part, of course, it will be understood that the movement of the second part relative to the first would be the full equivalent as long as the same result is obtained.

What I claim as new and desire to secure by Letters Patent, is:—

1. In an elapsed time recording machine the combination of elapsed time recording mechanism consisting of a number of type arranged in a straight line, representing different units of a denomination of time, and an elapsed time indicating mark located thereon opposite the initial unit of the denomination, clock-controlled means for moving them in a straight line past a printing device, and a printing device adapted on a first operation of the machine to print upon a suitable record surface in a straight line the line of type representing the units of the denomination and upon a second operation to print the elapsed time indicating mark, whereby the elapsed time between the two operations will be indicated upon the record surface.

2. In an elapsed time recording machine the combination of elapsed time recording mechanism consisting of a number of type arranged in a straight line, representing different units of a denomination of time, and an elapsed time indicating mark located thereon opposite the initial unit of the denomination, clock-controlled means for continuously moving them in a straight line past a printing device, and a printing device, adapted on a first operation of the machine to print upon a suitable record surface in a straight line the line of type representing the units of the denomination, and upon a second operation to print the elapsed time indicating mark, whereby the elapsed time between the two operations will be indicated upon the record surface.

3. In an elapsed time recording machine the combination of elapsed time recording mechanism consisting of a number of type arranged in a straight line representing different units of a denomination of time, an elapsed time indicating mark located thereon opposite the initial unit of the denomination, clock-controlled means for moving the recording mechanism in a straight line past the printing device and past a card adapted to be suitably mounted with reference thereto, a printing device adapted on a first operation of the machine to print upon the card in a straight line the line of type representing the units of the denomination and upon a second operation to print upon the card the elapsed time indicating mark, whereby the elapsed time between the two operations will be indicated upon the card.

4. In an elapsed time recording machine, the combination of a series of elapsed time recording mechanism, each mechanism consisting of a number of type representing different units of a denomination of time, arranged so that when brought past the printing line of the machine they will print in a straight line upon a suitable record surface, an elapsed time indicating mark located upon each recording mechanism opposite the initial unit of its denomination, a printing device adapted on a first operation of the machine to print upon the record surface in a straight line from each series of type and upon a second operation to print upon the record surface the elapsed time indicating marks, and clock-controlled means for moving the printing device with its record surface and the type relatively to each other, whereby a record may be printed upon a suitable record surface consisting of a plurality of series of units, each series of units arranged in a straight line upon the record surface and the relative location upon such surface of the units of each line as printed being dependent upon the time of the printing operation.

5. In an elapsed time recording machine the combination of a series of elapsed time recording mechanisms, each series consisting of a number of type arranged in a straight line and representing different units of a denomination of time, clock-controlled means for moving them in a straight line past a printing device, and a printing device, whereby a record may be printed upon a suitable record surface consisting of a plurality of series of units, each series of units arranged in a straight line and the relative location upon such record surface of the units of each line as printed being dependent upon the time of the printing operation.

6. In an elapsed time recording machine the combination of a series of elapsed time recording mechanisms, each mechanism consisting of a number of type arranged in a straight line and representing different units of a denomination of time, an elapsed time indicating mark located upon each recording mechanism opposite the initial unit thereof, clock-controlled means for moving the recording mechanisms in a straight line past a printing device, and a printing device, whereby a record may be printed upon a suitable record consisting of a series of columns, each column consisting of the units of its denomination arranged in a straight line and the relative location of such units in each column depending upon the time of the printing operation.

7. In an elapsed time recording machine the combination of an elapsed time recording mechanism consisting of a number of type arranged in a straight line and representing different units of a denomination of time, an elapsed time indicating mark located on said recording mechanism opposite the initial unit of the denomination, clock-controlled means for moving the recording mechanism in a straight line, two printing hammers, one arranged opposite the type representing the units of time and the other opposite the elapsed time indicating mark, and an operating device for each hammer, whereby either hammer may be operated and either the units of time may be printed in a straight line upon a record surface or the elapsed time indicating mark may be printed thereon.

8. In an elapsed time recording machine the combination of a series of elapsed time recording mechanisms, each mechanism consisting of a number of type arranged in a straight line and representing different units of a denomination of time, an elapsed time indicating mark located on each recording mechanism opposite the initial unit of the denomination, clock-controlled means for moving the recording mechanisms in a straight line, two series of printing hammers, one series opposite the type representing the different units of the different denominations of time and the other set opposite the elapsed time indicating marks, a separate operating device for each set of printing hammers, whereby when one operating device is actuated the different series of units of the different denominations of time will be printed in straight lines upon a record surface and when the other operating device is actuated the elapsed time indicating marks will be printed upon the record surface opposite the previously printed lines of units of time.

9. In the recording mechanism of an elapsed time recording machine, a clock-driven flexible band carrying on one side thereof type representing different units of a denomination of time and upon the other side an elapsed time indicating mark located thereon opposite the initial unit of the denomination, the band being adapted to move the type in a straight line past a printing point, whereby a record may be printed upon a suitable record surface consisting of the said units arranged in a straight line and of the elapsed time indicating mark printed opposite to some portion of the said line of units, the relative location of the said elapsed time indicating mark to the said line of units indicating elapsed time.

10. In the recording mechanism of an elapsed time recording machine, a clock-driven flexible band carrying on one side thereof type representing different units of a denomination of time and upon the other side an elapsed time indicating mark located thereon opposite the initial unit of the denomination, the band being adapted to move the type in a straight line, two printing hammers, one opposite one side of the band and the other opposite the other side of the band, and a separate operating device for each printing hammer.

11. In the recording mechanism of an elapsed time recording machine, a series of clock-driven flexible bands, each band carrying type representing different units of a denomination of time and adapted to move its type in a straight line past a printing device, whereby a record may be printed upon a suitable record surface consisting of a series of columns, each column composed of units of its denomination of time arranged in a straight line, the relative location upon such record surface of the units of each denomination as printed depending upon the time of the printing operation.

12. In the recording mechanism of an elapsed time recording machine, a series of clock-driven flexible bands, each band carrying type representing different units of a denomination of time arranged on one side thereof in a straight line and also carrying an elapsed time indicating mark arranged thereon on the other side and located opposite the initial unit of the denomination, whereby a record may be printed, on a suitable record surface, consisting of a series of columns of units each arranged in a straight line, and of an elapsed time indicating mark opposite each, the location of the marks relative to the lines of units representing elapsed time.

13. In the recording mechanism of an elapsed time recording machine, the combination of a series of clock-driven flexible bands, each band carrying on one side in a straight line type representing different units of a denomination of time and on the other side an elapsed time indicating mark located thereon opposite the initial unit of the denomination, and a series of hammers, two for each band, one hammer for each band being located opposite one side of the band and adapted to print from the type representing the different units of the denomination of time and the other hammer opposite the other side of the band and adapted to print the elapsed time indicating mark.

14. In an elapsed time recording machine, the combination of elapsed time recording mechanism consisting of type, representing different units of a denomination of time, arranged so that when brought past the printing line of the machine they will print in a straight line upon a suitable record surface, an elapsed time indicating mark located upon the recording mechanism opposite the initial unit of the denomination, a printing device adapted on a first operation of the machine to print upon the record surface in a straight line the type representing units of the denomination and upon a second operation to print upon the record surface the elapsed time indicating mark, and a clock controlled means for moving the printing device with its record surface and the type relatively to each other, whereby the elapsed time between the two operations of the machine will be indicated upon the record surface.

15. In an elapsed time recording machine, the combination of a series of elapsed time recording mechanisms, each mechanism consisting of a number of type representing different units of a denomination of time, arranged so that when brought past the printing line of the machine they will print in straight lines upon a suitable record surface, an elapsed time indicating mark located on each recording mechanism opposite the initial unit of its denomination, clock-controlled means for moving the printing devices with the record surface and the type relatively to each other, two series of printing hammers, one series opposite the type representing the different units of the different denominations of time, the other set opposite the elapsed time indicating marks, and a separate operating device for each series of printing hammers, whereby when one operating device is actuated the different series of units of the different denominations of time will be printed in straight lines upon the record surface, and when the other operating device is actuated the elapsed time indicating marks will be printed upon the record surface opposite the previously printed lines of units of time.

16. In the recording mechanism of an elapsed time recording machine, an endless flexible band carrying type representing different units of a denomination of time and adapted to move the type in a straight line past a printing point, two sprocket wheels for supporting said endless band, one a driving sprocket mounted on a fixed axle and adapted to be driven by clockwork and the other sprocket loosely supported and a tension device tending to move the loosely mounted sprocket away from the other sprocket in order to keep the band taut.

17. In the printing mechanism of an elapsed time recording machine, an elapsed time recording mechanism consisting of type representing different units of a denomination of time arranged so that when brought past the printing line they will print in a straight line upon a suitable record surface, and an elapsed time indicating mark located on the recording mechanism opposite the initial unit of the denomination.

In testimony whereof, I have signed my name to this specification, in the presence of two subscribing witnesses.

JAMES W. BRYCE.

Witnesses:
 EDWIN SEGER,
 GEO. M. HARRIS.